United States Patent
Ford et al.

(10) Patent No.: US 11,016,970 B2
(45) Date of Patent: May 25, 2021

(54) DATABASE QUERY EXECUTION TRACING AND DATA GENERATION FOR DIAGNOSING EXECUTION ISSUES

(71) Applicant: International Business Machines Corporation, Armonk, NY (US)

(72) Inventors: James A. Ford, San Jose, CA (US); Lakshman R. Sakaray, Overland Park, KS (US); Paul-John A. To, Olathe, KS (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 16/534,751

(22) Filed: Aug. 7, 2019

(65) Prior Publication Data
US 2019/0361889 A1    Nov. 28, 2019

Related U.S. Application Data

(63) Continuation of application No. 16/436,171, filed on Jun. 10, 2019, which is a continuation of application
(Continued)

(51) Int. Cl.
*G06F 16/2453* (2019.01)
*G06F 16/242* (2019.01)
*G06F 11/36* (2006.01)

(52) U.S. Cl.
CPC ........ *G06F 16/2453* (2019.01); *G06F 11/362* (2013.01); *G06F 16/2425* (2019.01)

(58) Field of Classification Search
CPC ................................................ G06F 16/2453
See application file for complete search history.

(56) References Cited

U.S. PATENT DOCUMENTS

| 10,380,109 B2 | 8/2019 | Ford |
| 10,394,808 B2 | 8/2019 | Ford |

(Continued)

FOREIGN PATENT DOCUMENTS

| CN | 102567351 A | 7/2012 |
| JP | 2008234495 A | 10/2008 |

(Continued)

OTHER PUBLICATIONS

List of IBM Patents or Patent Applications Treated as Related.
(Continued)

*Primary Examiner* — Mariela Reyes
*Assistant Examiner* — Courtney Harmon
(74) *Attorney, Agent, or Firm* — Anthony V. S. England; Richard Wilhelm; Susan M. Maze

(57) ABSTRACT

Trace data is received for a first execution of a first query on first tables having first data values. Second data values are generated for second tables from the trace data and without accessing the first data values. The second data values are configured to reproduce, by a second execution of a second query, the evaluation states from the first execution. Evaluation states from the first execution are reproduced without accessing the first data values by performing the second execution of the second query on the second data values. The first execution evaluates only a first subset of the first data values and the generating the second data values from the trace data generates second data values corresponding to the first subset. The second execution only evaluates ones of the second data values that correspond to data values of the first subset.

20 Claims, 3 Drawing Sheets

Related U.S. Application Data

No. 15/055,551, filed on Feb. 27, 2016, now Pat. No. 10,380,109, which is a continuation of application No. 14/632,236, filed on Feb. 26, 2015, now Pat. No. 10,394,808.

(56) References Cited

U.S. PATENT DOCUMENTS

| | | |
|---|---|---|
| 2009/0327809 A1 | 12/2009 | Joy |
| 2010/0094862 A1* | 4/2010 | Bent .................. G06F 16/2471 707/716 |
| 2011/0254978 A1 | 10/2011 | Yamaji |
| 2012/0109985 A1 | 5/2012 | Chandrasekaran |
| 2012/0143847 A1 | 6/2012 | Seo |
| 2012/0158698 A1* | 6/2012 | Bestgen ............ G06F 16/24542 707/718 |
| 2012/0197868 A1 | 8/2012 | Fauser |
| 2013/0067440 A1 | 3/2013 | Tendulkar |
| 2014/0298471 A1 | 10/2014 | Feng |
| 2016/0253377 A1 | 9/2016 | Ford |
| 2016/0253379 A1 | 9/2016 | Ford |
| 2016/0283345 A1 | 9/2016 | Gounares |

FOREIGN PATENT DOCUMENTS

| | | |
|---|---|---|
| JP | 2012524930 A | 10/2012 |
| JP | 2014211679 A | 11/2014 |

OTHER PUBLICATIONS

James A. Ford, et al. "Database Query Execution Tracing and Data Generation for Diagnosing Execution Issues." U.S. Appl. No. 14/632,236 , filed Feb. 26, 2015. A Copy is not Provided Herein, Since this Application is Internally Available to the Examiner.

James A. Ford, et al. "Database Query Execution Tracing and Data Generation for Diagnosing Execution Issues." U.S. Appl. No. 15/055,551, filed Feb. 27, 2016. A Copy is not Provided Herein, Since this Application is Internally Available to the Examiner.

James A. Ford, et al. "Database Query Execution Tracing and Data Generation for Diagnosing Execution Issues." U.S. Appl. No. 16/436,171, filed Jun. 10, 2019. A Copy is not Provided Herein, Since this Application is Internally Available to the Examiner.

PCT/IB2016/050960 International Search Report and Written Opinion dated Jun. 20, 2016.

Disclosed Anonymously, Functionality of Extracting Tables, Views and Other Database Objects Necessary for Execution of One or Few Queries, IP.com, IPCOM000213226D, Dec. 9, 2011.

Disclosed Anonymously, Method for Adaptive Data Generator Based on Reverse Engineering of Query Execution Plan, IP.com, IPCOM000234907D, Feb. 13, 2014.

UK examination report dated May 10, 2018 for the UK counterpart, Application No. GB1713089.9.

* cited by examiner

US 11,016,970 B2

DATABASE QUERY EXECUTION TRACING AND DATA GENERATION FOR DIAGNOSING EXECUTION ISSUES

BACKGROUND

In developing and administering database environments, it is necessary to identify database query execution issues. These issues may be data dependent and may include database crashes due to query execution, internal/external errors, wrong results, non-deterministic results, and performance degradations. These issues are more challenging to deal with in complex database environments, which may include cloud computing, big data and business analytical tools. These environments tend to involve systems with powerful computers coupled to large, fast storage systems.

SUMMARY

According to embodiments of the present invention, a method includes receiving, for a first execution of a first query on first tables having first data values, trace data having counts of evaluation states of the execution and identifications of query portions referencing variables of the tables and corresponding with the evaluation states. Second data values are generated for second tables from the trace data and without accessing the first data values. The second data values are configured to reproduce, by a second execution of a second query, the evaluation states from the first execution. Evaluation states from the first execution are reproduced without accessing the first data values by performing the second execution of the second query on the second data values. The first execution evaluates only a first subset of the first data values and the generating the second data values from the trace data generates second data values corresponding to the first subset. The second execution only evaluates ones of the second data values that correspond to data values of the first subset.

A system and computer program product relating to the above-summarized system is also described and claimed herein.

BRIEF DESCRIPTION OF THE DRAWINGS

The above described aspects of the present invention and others, including objects, forms, features and advantages, will become more apparent from the following detailed description of illustrative embodiments thereof, which is to be read in connection with the accompanying drawings. The drawings are not to scale and are, together with the detailed description, for clarity in facilitating the understanding of persons skilled in the related art. In the drawings.

DETAILED DESCRIPTION

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

In order for development and support teams to simplistically reproduce query execution issues of a target database within a reasonable time frame, they may use data, computing and storage resources on a similar scale as used in original execution. Even aside from the computing and storage resource challenge this presents, database administrators may not be willing to fully share target database data with development and support teams, such as due to privacy concerns, although an administrator will typically share the database's schema. According to embodiments of the present invention, a development or support team may generate alternative input data to use for troubleshooting, where the alternative input data is based on the target database schema.

In a brute force approach, data is generated that will satisfy all permutations of query predicates. For a query having three predicates, for example, where each predicate has two possible evaluation states, true or false, there are $2^3=8$ combinations of predicates, i.e., (T T T) (T T F) (T F T) (F T T) (F F T) (T F F) (F T F) (F F F). Thus, brute force data generation would involve generating data for each of these eight combinations to use for simulating query execution.

Alternatively, or in addition, developers may manually parse through machine generated queries and try to simplify by using their experience, which may include reviewing traces and log files captured in the original execution environment. This is tedious and time consuming. All these issues impact the ability of development and support teams to reproduce and isolate query execution issues.

Embodiments of the present invention provide ways to properly limit data and resources for successfully reproducing behavior of query execution in a target database while maintaining privacy of the target database's data. This includes providing specialized query tracing (herein, "fingerprint tracing" or "query fingerprint tracing") in a computer system 302 that serves a target database. This tracing leads to reducing data that is generated for reproducing behavior of a particular query.

Figure 3:
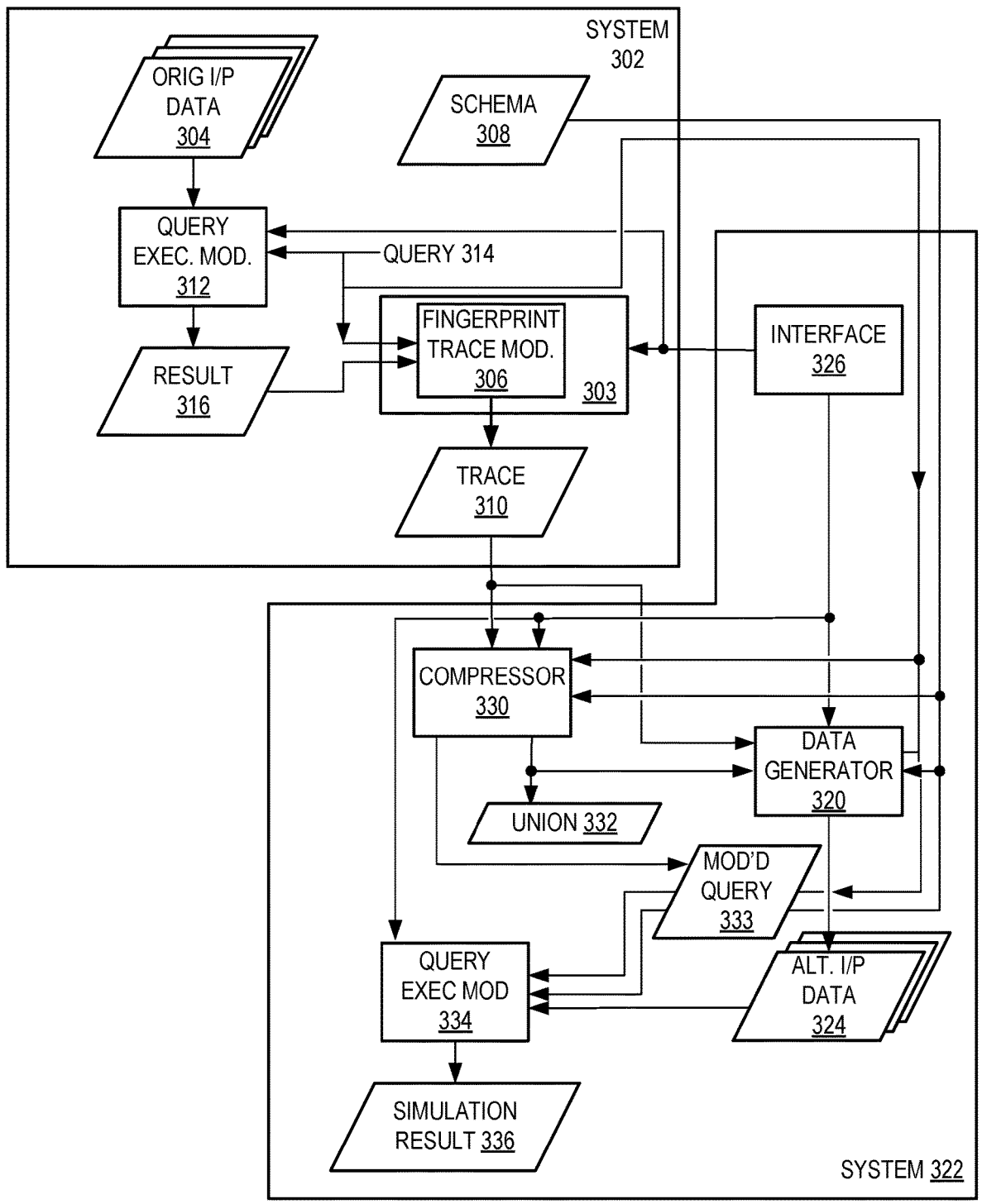
FIG. 3 illustrates certain aspect of join processing, according to embodiments of the present invention.

Referring now to FIG. 3, query fingerprint tracing may be implemented in a computer system 302 serving the target database 304 by executing a fingerprint tracing program 303 on the computer system 302, according to embodiments of the present invention. The fingerprint tracing program 303 includes a tracing module 306 running on the computer system 302 serving the target database 304, wherein the module 306 applies tracing to clauses, such as join filters and predicate evaluations, as well as to clauses for zone maps, synopses or indices, whichever one or more apply, depending on the particular target database 304. (The term "zone map" may be used herein to refer to a zone map, a synopsis or an index.) This includes capturing a fingerprint trace 310 during query 314 execution by a query execution module 312 for a given input data set 304. Trace 310 provides a record of evaluation states that arise for rows of evaluated data 304.

A data generation tool 320 (also referred to herein as a DGT or a "data generator" or a "data generation module") is also provided, which may be part of the fingerprint tracing program 306 or may be a separate module. Likewise, data generation module 320 may run on the computer system 302 serving the target database 304 or on a different computer system 322, as shown in FIG. 3.

Query fingerprint trace module 306 or some other module for compressing, such as module 330 shown in FIG. 3, determines union data 332 responsive to these captured evaluation states in fingerprint trace data 310, as explained further herein below. Whatever module compresses the data may be referred to as the "data compressing module," "DCM," "compressing module" or "compressor." Although illustrated as a separate data set in FIG. 3, union data 332 may be included in trace data 310. DGT 320 and compressor 330 may be a single module, according to embodiments of the present invention. Therefore, reference herein to compressor 330 may be construed as referring alternatively to DGT 320, for example.

DCM 330, according to embodiments of the present invention, also generates a modified query 333 responsive to trace data 310, wherein modified query 333 may omit certain clauses of query 314 according to union data 332. Implementation details for generating union data 332 are further described in connection with examples presented herein below.

Data generation module 320 generates alternative input data 324 for reproducing behavior of the original query execution module 312 execution of the original query 314, i.e., data that is to be used by a support or development team, for example, for simulating behavior of the original query execution of the target database 304. The DGT 320 parses the fingerprint trace data 310 or, alternatively, union data 332 version thereof, and responsively generates alternative input data 324 based on the trace data 310 (or union data 332), the target database schema 308 and the original query 314 or a modified query 333.

A query execution module, such as module 334 system 322, executes a query on the alternative input data 324 to produce a simulation result 336 that simulates the original execution that led to original result 316, where the query may be modified query 333 based on union data 332 or may be the original query 314, depending upon the embodiment.

Query fingerprint tracing such as illustrated in FIG. 3 may be applied in a context wherein a database query execution issue arises on computer system 302 serving target database 304. The issue may include, for example, a database crash, internal/external error, wrong result, non-deterministic result, poor performance or any combination thereof. The user who encounters the issue(s) may be an administrator or other user at a client computer system 322, from which the user may be accessing the target database 304 via a network with the computer system 302 serving the target database 304. The client computer system 322 may have a client fingerprint tracing interface module 326 for communicating with the fingerprint tracing program 306 running on the computer system 302 serving the target database 304.

fingerprint tracing program 306 executing on the computer system 302 serving the target database 304, which responsively verifies the session variable and then begins fingerprint tracing, which includes scanning the query 314 to determine parameters thereof, such as tables, columns, predicates, values, join filters, etc. Then fingerprint tracing program 306 gathers data for the query 314 responsive to the parameters.

The fingerprint tracing program 306 monitors each row evaluation for given query predicates in a given data set 304 during query execution by module 312 and responsively generates a fingerprint trace 310, which may be in a particular format as described herein below, according to embodiments of the present invention. That is, query fingerprint trace module 306 determines combinations of predicate evaluation results. (Each of these evaluation results may also be referred to herein as an "evaluation state." Since they are results for predicate evaluations, each may be referred to as a "predicate evaluation state" or more simply as a "predicate state.") Module 306 captures evaluation states as further described herein below.

In addition, or alternatively, the fingerprint tracing program 306 captures evaluations and generates fingerprint traces 310 for join filters. Likewise, the fingerprint tracing program 306 may capture evaluations and generate fingerprint traces 310 for zone maps. Predicate evaluation is first described in the following examples. Thereafter, examples are presented for join filters and zone maps, according to embodiments of the present invention.

Consider a query having an OR combination of three predicates, i.e., P1 OR P2 OR P3, such as "(dept_name='Dev' OR dept_name='Hardware' OR dept_name='Sales')," where "dept_name='Dev'" is P1, etc. (Herein, a combination of predicate states may be stated without logical operators, such as "P1P2P3," since it merely indicates the evaluation states of the individual predicates. It should be understood that "P1P2P3," for example, may apply for queries having combinations such as (P1 OR P2 OR P3), (P1 AND P2 AND P3), (P1 AND (P2 OR P3)), etc.)

A reduction in generated data follows from aspects of embodiments of the present invention. One aspect involves a recognition that in query execution by module 312, input data 304 is processed according to a fixed, known order of the query 314 predicates, such as from right to left, for example, i.e., P1, then P2 then P3. Accordingly, regarding a query 314 having an OR combination of three predicates, for example, embodiments of the present invention involve a recognition that once query execution module 312 has determined that input data 304 for a first set of corresponding rows satisfies the first predicate, P1, module 312 commits the result 316 and moves on to evaluating the next set of rows in the input data 304, without evaluating to determine whether the rest of the first set of rows satisfy P2 or P3.

For a query like the above example, with an OR combination of three predicates, embodiments of the present invention may result in generating a data set having data values that give rise to only three combinations of predicate evaluation states. One of the combinations is P1=True, P2=I and P3=I, where "I" indicates an evaluation state that does not matter, True or False, i.e., a "don't care" evaluation state. (This may be written as P1P2P3=TII.) The "I" state and its application will be explained further herein below. The other two combinations are P1P2P3=FTI and P1P2P3=FFT.

This leads to a further recognition that in generating alternative input data 324 for use in simulating the same query execution of the original data 304, it may not be necessary in this situation for DGT 320 to reproduce data 324 like that in the rest of the first set of rows of the original data 304. For example, when a query execution module 312 determines that an evaluation state arises and satisfies the query 314 for a first set of input data 304 rows, such as P1=T in the above example, module 312 moves on to evaluating the next set of rows in the input data 304 without evaluating whether the data in the first set of rows satisfies other predicates of the query. In this situation, fingerprint trace module 306 responds by indicating an "I" state for the other, remaining predicates, such as P2 and P3 for a query having an OR combination of three predicates, as in the above example.

The same logic configured in the fingerprint trace module 306 leads to capturing P3=I in the second combination, P1P2P3=FTI, since P2=T. In other words, the query 314 includes at least a first predicate and another predicate and the evaluation states captured by the fingerprint trace 310 include an unevaluated state "I" for a predicate in the query 314 that the original query execution by module 312 did not evaluate, wherein it did not evaluate because the original query execution determined first data in a set of rows of the input data 304 satisfied the first predicate and determined that the first predicate satisfied the query 314, regardless of whether the data in the set of rows satisfied the other predicate.

In another aspect of embodiments of the present invention, alternative input data 324 is not generated having data values that give rise to the combination of predicate evaluation states P1P2P3=FFF in the above example, because embodiments of the present invention involve a recognition that this data can be ignored as potential causes of crashes or other problems. According to this aspect of embodiments of the present invention, a fingerprint trace module 306 is configured to not capture individual predicate evaluation states in trace data 310 for a query execution module's 312 evaluation of a set of corresponding input data 304 rows having values that do not satisfy a query 314, such as P1P2P3=FFF in the above example. Alternatively, a fingerprint trace module 306 may be configured to capture individual predicate evaluation states in trace data 310 for such a situation, but data generation module 320 is configured to not generate alternative input data 324 for such trace data 310. Still further, data generation module 320 may be configured to generate alternative input data 324 for such trace data 310 with the exception of each predicate for which the union result 332 of all instances of trace data 310 has an "F" state. A truth table for computing union results is presented and explained further below.

The following is an example of generating a fingerprint trace 310 for predicate evaluation, according to embodiments of the present invention, in which tracing module 306 captures aspects of predicate evaluation that occur in original query execution 312 of the target database 304. In this example, the "I" state is not included, which is merely for simplicity of explanation. Further herein below an example is provided in which the "I" state is included. The example query ("Example 1") is as follows:

SELECT id, emp_name, salary FROM emp, grp

WHERE id=(select id from grp where grp_name='dev' or grp_name='test') OR salary>25000

In this example, the first predicate, P1, is "WHERE id=(select id from grp where grp_name='dev' or grp_name='test')" and the second predicate, P2, is "salary>25000." (Alternatively, "grp_name='dev' or grp_name='test'" may be treated as two predicates.)

In the execution 312 of this query 314, suppose that for a given input data set, i.e., target database 304, there are two rows in the "grp" table for which the first predicate, P1, evaluates as "false" and the second predicate, P2, evaluates as "true," there are two other rows for which P1 evaluates as "false" and P2 also evaluates as "false," and there are no rows for which P1 evaluates as true, regardless of how P2 evaluates. These row evaluation results captured as trace 310 are summarized in the "Predicate Fingerprint Trace Data" table below, where "T" indicates true and "F" indicates false.

Predicate Fingerprint Trace Data (Example 1)

| P1 | P2 | Count |
|---|---|---|
| F | F | 2 |
| F | T | 2 |
| T | F | 0 |
| T | T | 0 |

The combinations of predicate states may be presented as rows in a table such as above, where each row is for a unique combination of predicate states. (It should be understood that the table may alternatively indicate combinations for which there are no evaluation results by simply omitting those rows. Further, the table may omit the row setting out the combination for which evaluation results are false for all predicates.)

For two predicates and two predicate states, T and F, there are four possible combinations of states, FF, FT, TF and TT, so an evaluation result state table may set out four evaluation result rows, as shown above. For each combination of evaluations (i.e., row in the table), query fingerprint trace module 306 captures a count of how many such evaluation combinations occurred in the original execution 312 of the query 314 on the target database 304, with its schema 308. For this example, as the above table shows, there are 2 instances of evaluation combination FF, 2 instances of evaluation combination FT, 0 instances of evaluation combination TF, and 0 instances of evaluation combination TT.

As previously stated, query fingerprint trace module 306 or some other module for compressing, such as module 330 shown in FIG. 3, determines union data 332 responsive to these captured evaluation states in fingerprint trace data 310, wherein for any predicate that was evaluated as true for one of the combinations, i.e., for one row in the above table, the union value for that predicate is also true, like a logical OR condition. (Whatever module compresses the data may be referred to as the "data compressing module," "DCM" or "compressing module.")

For the given example, there are no instances of a true predicate P1, so the union 332 of all the P1 predicate evaluation combinations=F. There are instances of a true predicate P2, so the union of all the P2 predicate evaluations=T. According to embodiments of the present invention, the DCM does not count execution instances for which evaluation results are false for all predicates. Accordingly, the total number of instances of predicate evaluations for the other three types of combinations in this example is 2, so the DCM determines the union data count=2. This union result 332 for this example is summarized as follows:

| P1 | P2 | Count |
|---|---|---|
| F | T | 2 |

Alternatively, DCM 330 may count execution instances for which evaluation results are both true and false for predicates that have a true union result 332, in which case the count is 4 in the above union result 332 table for this example. Since this union result 332 determined by the DCM 330 is false for the given query predicate P1 and target database 304, this causes the DGT 320 to eliminate predicate P1 for modified query 333 in embodiments using the union result 332. Accordingly, DGT 320 does not generate alternate data 324 for predicate P1. For predicate P2, the DGT 320 generates test data 324 according to the predicate evaluation trace 310 captured during original query execution 312 of the target database 304. In this particular case, this means the DGT 320 generates rows of test data 324 in the grp and emp tables having enough values to make the predicate P2 (salary>25000) evaluate as true at least twice, in accordance with trace 310 per the above Predicate Fingerprint Trace Data table and per the union result 332. In the alternative where the DCM does count execution instances for which evaluation results are false for all predicates, the DGT 320 generates rows of test data 324 in the grp and emp tables having enough values to make the predicate P2 (salary>25000) evaluate as false at least twice and rows of test data having enough values to make P2 evaluate as true at least twice.

The following tables provide examples of alternative input data 324 that the DGT 320 may generate for Example 1.

| Emp table | | |
|---|---|---|
| Id | emp_name | salary |
| 1007100 | randomText1 | 25001 |
| 1007101 | randomText2 | 25002 |
| 1007102 | randomText3 | 24998 |
| 1007103 | randomText4 | 24999 |

| Grp table | |
|---|---|
| Id | grp_name |
| 1107100 | randomText11 |
| 1107101 | randomText12 |
| 1107102 | randomText13 |

P2 requires salary>25000 and the above "Predicate Fingerprint Trace Data (Example 1)" table indicates two instances of trace data 310 for which P2 is false (first row of the table) and two instances of trace data 310 for which P2 is true (second row of the table), so for this example DGT 320 generates four values for predicate P2 in alternate data 324, two of which are greater than 25000 and two of which are less than or equal to 25000. Employee names (emp_name field) are not included in any predicates, so DGT 320 generates random data for the rows of this field. All group names yielded false evaluation states, so DGT 320 generates random data for the rows of this field, except that the random data is constrained to NOT="dev" and NOT="test."

Alternatively, for the query 333 that is executed by module 334 for simulation, compressor 330 may eliminate predicate P1, i.e., "grp_name='dev' or grp_name='test'." Compressor 330 may, correspondingly, eliminate reference to the Grp table ("grp") from the SELECT statement, so that modified query 333 is as follows:

SELECT id, emp_name, salary FROM emp
WHERE salary>25000

In this alternative, DGT 320 does not generate any data at all for the Grp table and may even select to not define the Grp table. In this alternative, DGT 320 may generate alternate data 324 having four values for predicate P2, two of which are greater than 25000 and two of which are less than or equal to 25000, as described above, or may alternatively generate alternate data 324 having only two values for predicate P2, both of which are greater than 25000.

In Example 1 hereinabove, predicate states "T" and "F" were presented as evaluation state variables in the fingerprint trace data table. According to embodiments of the present invention, there may be additional predicate states. As previously mentioned, a state "I" may be included, which indicates a predicate has not been evaluated for at least the following reason. Each row that is generated for the result table may arise from evaluation of less than all the predicates of the query, if the query is satisfied by less than all of the predicates. Thus, when some of the predicates satisfy the query for a particular combination of corresponding rows from the input tables, evaluation of others of the predicates for that particular combination may be intentionally skipped and each of the states for these other predicates may be indicated by "I."

The evaluation state variables in the fingerprint trace data table for evaluation of a query may also include a state "E," which indicates a predicate was under evaluation when the fingerprint trace data 310 was captured. This state may arise because the query 314 execution by module 312 may stop before completion of full evaluation, such as due to a crash or due to a user stopping the execution, for example.

The following table summarizes the four evaluation states, according to embodiments of the present invention.

Meaning of Evaluation States

| State | Table Tag | Interpretation |
|---|---|---|
| I | not been evaluated | Skip data generation of the row and consider for predicate elimination in the query |
| E | under evaluation | Skip data generation of the row and keep the predicate |
| T | evaluated to true | Generate data for the row as evaluated value to the predicate to true. |
| F | evaluated to false | Generate data for the row as evaluated value to the predicate to true. |

The following is another example query ("Example 2"):

SELECT emp_name, dept_name, salary FROM emp e
  JOIN register r ON e.emp_id=r.emp_id JOIN dept d
  ON r.dept_id=d.dept_id WHERE salary>3000 AND
  (dept_name='Dev' OR dept_name='Hardware' OR
  dept_name='Sales');

This example illustrates, among other things, the additional query evaluation state I captured in fingerprint trace data 310. Note that in Example 2 "(dept_name='Dev' OR dept_name='Hardware' OR dept_name='Sales')" is treated as three predicates, whereas in Example 1, "(select id from grp where grp_name='dev' or grp_name='test')" is treated as one predicate. As previously mentioned, these are two alternatives, according to embodiments of the present invention.

The query of this Example 2 may be satisfied by any combination of corresponding rows from the input tables wherein P1 is true and one or more of P2, P3 and P4 are true. Thus, if P1 and P2 are true, for example, the query 314 is satisfied. Once it is determined that P1 and P2 are true for a combination of corresponding input table 304 rows, it does not matter whether P3 or P4 are true for those rows. So a query evaluation module 312 may stop without evaluating P3 and P4 after evaluating P1 and P2 in such a case and may commit the data from those input table 304 rows to a row of a result table 316, where the state variable for the predicates P1, P2, P3 and P4 of such a row in the result table 316 is TTII.

The following is a list of tables and columns involved in this example query:

| Table Name | Table Tag | Column List |
|---|---|---|
| Emp | T1 | emp_name, e.emp_id, salary |
| Dept | T2 | dept_name, d.dept_id |
| Register | T3 | r.emp_id, r.dept_id |

The following is a list of predicates involved in the query:

| Predicates | Predicate tag |
|---|---|
| salary > 3000 | P1 |
| dept_name = 'Dev' | P2 |
| dept_name = 'Hardware' | P3 |
| dept_name = 'Sales' | P4 |

The following is a list of capture join filters involved in the query:

| Join Type | Join Filter | Filter tag |
|---|---|---|
| I | I e.emp_id = r.emp_id | J1 |
| I | r.dept_id = d.dept_id | J2 |
| I | r.dept_id = d.dept_id | J3 |

The following are example input tables for this query:

Emp Table

| EMP ID | EMP NAME | SALARY |
|---|---|---|
| 1 | James | 2300 |
| 2 | Jack | 4500 |
| 3 | Henry | 6600 |
| 4 | John | 8900 |
| 5 | Jim | 5300 |
| 6 | Mike | 9700 |
| 7 | Sonia | 5500 |
| 8 | Sanjay | 5200 |
| 9 | Craig | 4220 |
| 10 | Barry | 3600 |
| 11 | Foster | 7800 |
| 12 | Prem | 2200 |

Dept Table

| DEPT_ID | DEPT_NAME |
|---|---|
| 101 | Sales |
| 102 | Marketing |
| 103 | Finance |
| 104 | Dev |
| 105 | Hardware |
| 106 | Admin |
| 107 | Software |

Register Table

| EMP_ID | DEPT_ID |
|---|---|
| 1 | 101 |
| 2 | 102 |
| 3 | 103 |
| 4 | 102 |

-continued

Register Table

| EMP_ID | DEPT_ID |
|---|---|
| 5 | 104 |
| 6 | 105 |
| 7 | 106 |
| 8 | 104 |
| 9 | 102 |
| 10 | 103 |
| 11 | 105 |
| 12 | 104 |

The following is the result of applying the above query to the above input tables:

Result Table (Example 2)

| EMP_NAME | DEPT_NAME | SALARY |
|---|---|---|
| Foster | Hardware | 7800 |
| Jim | Dev | 5300 |
| Mike | Hardware | 9700 |
| Sanjay | Dev | 5200 |

Recapping at least some of the above, a DGT 320 generates alternative input data 324 to use for simulating execution of a query 314 by a different execution module 334 than the module 312 that originally executed the query 314, or at least on alternative input data 324, even if by the same module 312. This is since the original data 304 on which the query 314 originally was processed may not be available, such as due to privacy reasons. The original data 304 may be too voluminous even if it were available. The simulation may be helpful for determining why query execution failed or performed poorly on the original data 304. Even if the query execution performed adequately on the original data 304, the simulation may be done for analyzing how to improve query execution performance.

DGT 320 generates alternative input data 324 responsive to schema 308, and fingerprint trace data 310 captured during execution of the query 314 on the original data 304. DGT 320 generates alternative input data 324 further in response to original query 314 or in response modified query 333. (Since modified query 333 is generated based on query 314, it may still be said the DGT generates alternative input data 324 in response to query 314.)

Fingerprint trace data 310 is captured by a fingerprint tracing program 306. That is, at the time when query 314 is executed on the original data 304, the fingerprint tracing program 306 captures certain state data for each evaluation (or at least for selective evaluations) pursuant to the query predicates and original input data set 304 and responsively presents the state data as a fingerprint trace 310. The state data includes each particular combination of possible predicate states and a count of the number of instances of that combination occurring in the evaluation process, according to embodiments of the present invention. Alternatively, the state data of trace 310 may simply indicate by omission those combinations for which there were no evaluation instances. Thus, the fingerprint trace data 310 indicates the evaluation state of each predicate in the combination at the time when the trace data 310 is captured, which may be when query execution failure occurs.

The following Fingerprint Data Table is for a successfully completed query execution per the above Example 2. It presents fingerprint trace data 310 captured during execution of the query on the original data 304. Since it is for a successfully completed query execution, it includes no "E" states. In this example, trace 310 omits evaluation instances that do not satisfy the query, such as FFFT for James in Sales (which would be captured as FIII, since the initial P1=F rules it out for this particular query), and such as TFFF for Henry in Finance and Jack and John in Marketing, etc.

| Fingerprint Trace Data Table (Example 2) | | | | | |
|---|---|---|---|---|---|
| P1 | P2 | P3 | P4 | Count | |
| T | T | I | I | 2 | |
| T | F | T | I | 2 | |
| T | T | T | I | 4 | union result |

For this example, as shown in the first row of the above Fingerprint Trace Data Table (Example 2), P1 and P2 are true in two instances, i.e., the rows for Sanjay and Jim, who both have salaries above $3000 (P1) and who both are in the "Dev" department (P2). These conditions satisfy the query regardless of the results of evaluating P3 and P4 for corresponding combinations of rows in the original data 304 input tables, i.e. rows 5, 4 and 5 in the Emp, Dept and Register tables, respectively for Jim, and rows 8, 4 and 5 in those same tables for Sanjay. Therefore, it does not matter whether P3 or P4 are true for those rows. So the query evaluation module stopped without evaluating P3 and P4 after evaluating P1 and P2 in these cases and the fingerprint trace module 306 incremented the count for the "TTII" combination of P1P2P3P4 predicate evaluation states that had arisen when the query execution module 312 committed the data from those input table 304 rows to a row of the result table 316.

For this same example, as shown in the second row of the above Fingerprint Trace Data Table (Example 2), P1 is true in two more instances, i.e., for Mike and Foster, i.e., rows 6 and 11 of the Emp Table, but P2 is not true for either of them, since neither Mike nor Foster are in the Dev department. This can be seen from rows 6 and 11 of the Register table, which both point to row 5 of the Dept table, indicating they are both in the Hardware department. However, the Hardware department satisfies P3. Consequently, during execution of the query on the original Emp, Dept and Register tables, the query execution module committed rows 1 and 3 to the result table 316 for Foster and Mike, respectively, wherein the state of predicate evaluation at those times was TTTI in both cases. Each time, the fingerprint trace module 306 incremented the counter for the TTTI combination of predicate states.

The following is an example of how DGT 320 may generate alternative input data 324 by a directed random process in embodiments of the present invention. To prepare an initial population of values from which to select values that satisfy different combinations of at least three predicates, P1, P2 and P3, for example, DGT 320 generates N values U that satisfy P1 (i.e., U1 through Un), N values V that satisfy P2 (i.e., V1 through Vn), N values W that satisfy P3 (i.e., W1 through Wn), N values X that do not satisfy P1 (i.e., U1 through Un), N values Y that do not satisfy P2 (i.e., V1 through Vn), N values Z that do not satisfy P3 (i.e., W1 through Wn), where U is for a column in table 1, V is for a column in table 2 and W is for a column in table 3, for example.

To generate a combination of values such that P1P2P3=TFT, for example, DGT 320 generates a random value for N and selects the corresponding U, generates a next random value for N and selects the corresponding Y, and generates a next random value for N and selects the corresponding W. The combination of selected values for U, Y and W will evaluate to TFT. DGT 320 writes each of the selected these values in its respective table in corresponding rows, i.e., rows that are linked to one another.

When rows in the tables are linked together by additional data, as indicated by schema 308, this requires DGT 320 to generate data in addition to the above described directed, random generation of values that satisfy predicates. For example, row 5 of the Register table in the above example is linked to row 5 of the Emp table by each having the same value in the emp_id column. Similarly, row 5 of the Register table in the above example is linked to row 4 of the Dept table by each having the same value in the dept_name column. To link generated values together that satisfy predicates, DGT 320 generates random values and writes them to columns that link corresponding rows having the generated values for satisfying predicates in the tables.

According to embodiments of the present invention, the DCM compresses the trace 310 table of evaluation states and their respective counts. (This may be done as part of the fingerprint tracing program 306 or else this compression may be done by another program, which may be on another computer system 322, such as one on which the DGT 320 generates the alternative input data 324.) This compressing may be done as described herein above regarding Example 1, wherein a union 332 operation is performed on each column of the captured fingerprint trace table 310. However, the following additional details are presented below since Example 1 illustrates a fingerprint trace 310 that has only two states, whereas the trace 310 may capture four evaluation states, as Example 2 illustrates. The following Truth Table provides rules that apply to union operations for all four evaluation states.

| Union Truth Table |
|---|
| T × T = T |
| T × F = T |
| T × I = T |
| T × E = T |
| F × E = T |
| F × F = F |
| F × I = F |
| I × E = E |
| E × E = E |
| I × I = I |

The compressing module 330 that performs the compressing may be a module of the fingerprint trace program 306 or of the data generation program or of another program. The compressing module 330 performs the above, truth-table-defined union operations on the evaluation states in a column of the fingerprint trace data 310. See the bottom row of the Fingerprint Data Table of Example 2 herein above, for example.

Once the above Fingerprint Data Table is provided to it, compressing module performs union operations on the evaluation states in each column thereof. For the first column, T×T=T. For the second column, T×F=T. And so on. For larger data sets, the Fingerprint Data Table will tend to have more rows, of course. If there are three rows to be compressed, then, after the first union operation of the first and second rows in a column, a second union operation is performed using the evaluation state in the third row in the same column and the result from the first union operation. If there are four rows to be compressed, a third union operation is performed on the result from the second union operation. And so on if there are still more rows.

The DGT 320 uses the fingerprint trace data 310 and the compressed version of the fingerprint trace data 310, i.e., the result of the union operations, to determine what data to generate for including in the set of alternative input data 324, which is for the query execution module 334 to process as a simulation of processing the original data 304. More specifically, for Example 2 the DGT 320 generates rows in Emp, Dept and Register tables having values for which query execution cause at least two instances of the query predicate evaluation states P1P2=TT (first row of Fingerprint Trace Data Table for Example 2 herein above) and at least two instances of the states P1P2P3=TFT (second row). In other words, DGT 320 generates rows with values that yield evaluation states like the values do in rows 5, 4 and 5 of the Emp, Dept and Register tables for Jim, like the values do in rows 8, 4 and 5 of those same tables for Sanjay, and like the values do in rows 6 and 11 of the Emp and Register tables and in row 5 of the Dept table for Mike and Foster. But DGT 320 generates this alternative input data 324 without access to the original data 304 itself, which means without actual employee names, salaries, etc.

Notice that for Example 2 the DGT 320 does not necessarily generate data in the Emp, Dept and Register tables for predicate P4. This is because during query execution on the original data, the fingerprint trace state that was captured for P4 was "T" in all instances, as can be seen from the individual rows of the fingerprint trace data 310 and also can be seen from the P4 column of the all-row union result. In general, the DGT 320 may use union result 332 to determine predicates for which the DGT 320 does not need to generate data, i.e., those predicates that do not have a T state for union result 332, as determined per the logic indicated by the above Union Truth Table. According to embodiments of the present invention, the DGT 320 does not generate such data.

For "I" in the Meaning of Evaluation States table herein above, the table says "consider for predicate elimination in the query." This is because the union of "I" and "F" is "F," according to the Union Truth Table, which indicates do not keep the predicate in the simulation query, but the union of "I" and "T" is "T," according to the Union Truth Table, which indicates do keep the predicate in the simulation query. So, whether to keep or not keep a predicate having an "I" state in one row of trace data depends on the union result of the row with other rows, which may have "T" or "F" states.

For "E" in the Meaning of Evaluation States table herein above, the table says "keep the predicate." This is because the union of "E" and "F" and the union of "E" and "T" are both "T," according to the Union Truth Table, which indicates to keep the predicate in the simulation query, regardless of the "T" or "F" states of other rows. That is, whether to keep or not keep a predicate having an "E" state in one row of trace data does not depend on the union result of the "E" state row with other rows that have "T" or "F" states.

For "F" in the Meaning of Evaluation States table herein above, the table says "Generate data for the row because evaluated value of the predicate was false." This means that if a predicate in a trace data 310 row has an "F" state, DGT 320 does generate a row of alternate data 324 for that predicate of that row (i.e., a data value that will evaluate as "F" in executing simulation query 333), except, however, when the union result 332 for that predicate is "F," in which case compressor 330 eliminates that predicate for simulation query 333, which means DGT 320 can skip generating data 324 for that predicate.

The following is another example query (Example 3):
SELECT emp_id, emp_name, salary FROM emp e WHERE salary>3000 OR emp_id=(SELECT emp_id FROM register WHERE dept_id=107);

This example query illustrates, among other things, how aspects of query modification logic of compressor 330 operate to enable proper simulation query execution by module 334 for alternative input data 324 generated by generator 320. The example contains a subquery that will never become true in the dataset given, because the Register table herein above indicates dept_id=107 (software) has no employees registered. Consequently, all evaluation states in trace data 310 for the predicate "SELECT emp_id FROM register WHERE dept_id=107" on this example data will be "F" or at least "I," provided that query evaluation is not stopped prematurely, in which case there may be an "E" state. As long as there is no "E" state for this predicate, compressor 330 will, accordingly, indicate "F" for this predicate in union data 333, since the Union Truth Table indicates that the union result is "F" for a union of "F's" and for a union of "F" and "I."

For embodiments or modes of the present invention that generate alternative input data 324 for union data 332 rather than for all predicate combination instances of fingerprint trace data 310, compressor 330 generates a modified query 333 that omits this predicate from original query 314 responsive to the "F" indication for this predicate in union data 333. Accordingly, due to the absence of this predicate in modified query 333, simulation query execution module 324 does not attempt to read alternative input data 324 for this predicate when executing modified query 333.

This is particularly useful, because alternative input data 324 will not have data for this predicate, since in this mode or embodiment data generator 320 generates no data for this predicate for the same reason that compressor 330 generates a modified query 333 omitting this predicate, i.e., due to union data 333 indicating F for this predicate. Note that this is particularly useful in this instance that data generator 320 generates no data for this predicate because data for this predicate is the only non-key data column for the Register table. Thus, data generator 320 does not have to generate the Register table at all.

SQL JOIN clauses are used to combine rows from two or more data tables based on a common field. According to embodiments of the present invention, fingerprint tracing is performed for JOIN evaluations in the same manner as described above for predicate evaluation by fingerprint trace module 306 monitoring JOIN evaluations by query execution module 312. In the same manner as fingerprint tracing for predicate evaluation, this reduces data generated for alternative input data 324, which may even include eliminating generation of entire tables, as in the above example, and unwanted rows that don't coincide between tables. Also, in the same manner as fingerprint tracing for predicate evaluation, fingerprint tracing JOIN evaluation provides fingerprint trace data 310 or union data 322 or both, enabling DGT 320 to generate alternative input data 324 for table columns as indicated by the JOIN

CLAUSES

Figure 4:
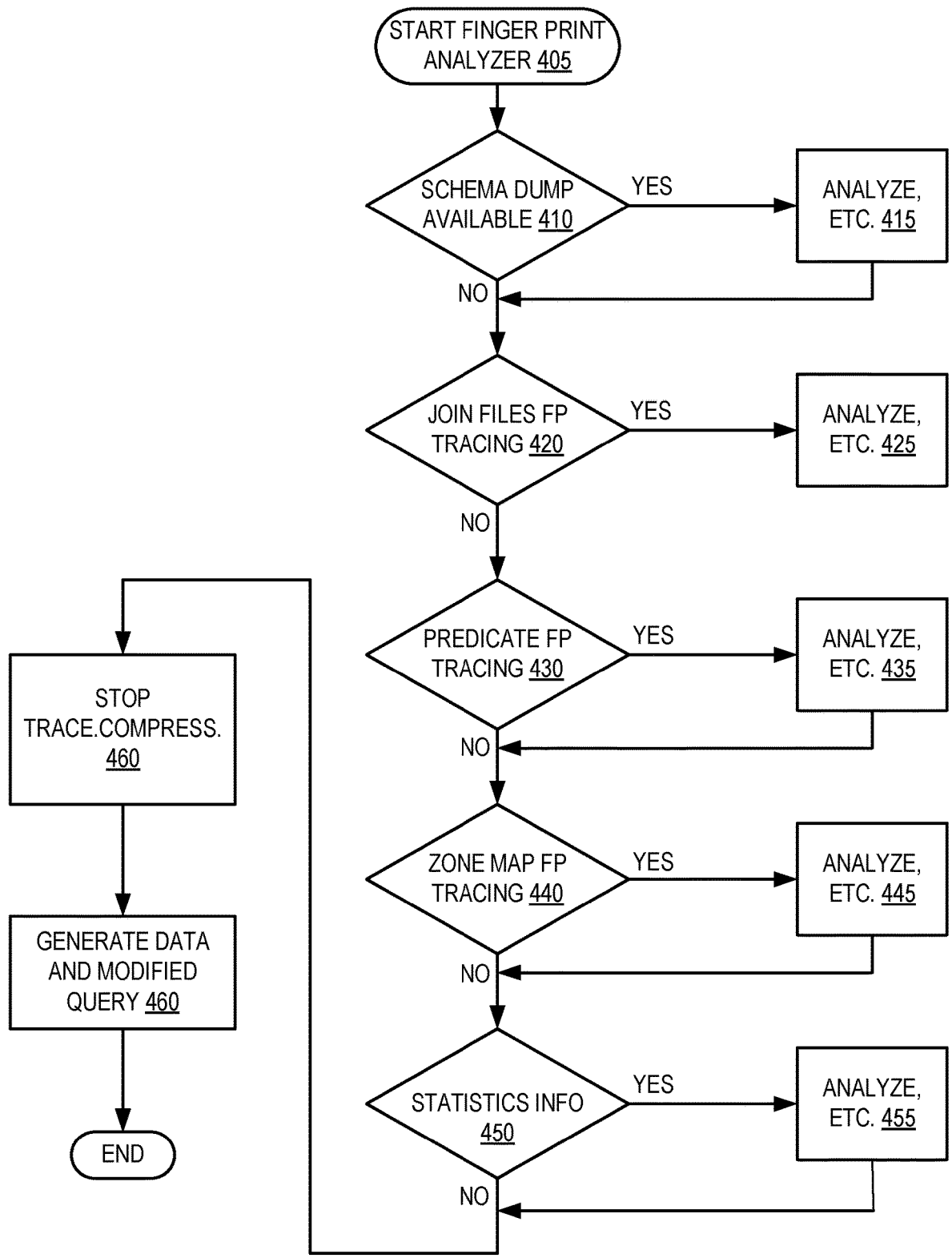
FIG. 4 illustrates additional aspects of join processing, according to embodiments of the present invention.

Referring now to FIG. 4 together with FIG. 3, actions are shown in FIG. 4, according to embodiments of the present invention, which relate to producing alternative input data 324 and modified query 333 and which relate to simulation by query execution module 334 of original query 314 execution by module 312, wherein query execution module 334 executes modified query 333 for alternative input data 324. According to embodiments of the present invention, DGT 320 and compressor 330 (the two of which may, alternatively, be a single module, according to embodiments of the present invention) perform actions such as shown in FIG. 4, which includes scanning through and parsing trace data 310 and schema data 308. (Although FIG. 3 illustrates schema 308 as a separate data structure, it may be included in trace file 310. Trace file 310 may include special trace files of predicate, join filter, zone maps evaluation, statistics, schema dump 308 and other log files useful for diagnostic purpose as explained herein and may be in the form of a single tar ball file, like what is created by a utility such as nzlogcollector.)

The actions 400 depicted in FIG. 4 begin, for example, when the user encounters an issue for which fingerprint tracing is useful. The user may start 405 tracing by communicating via interface 326 with fingerprint tracing program 306. Specifically, the user may start 405 tracing such as by issuing a session variable "SET SQL_FINGERPRINT_TRACE=ON" to fingerprint tracing interface 326. Upon the user issuing the session variable, the client fingerprint tracing interface 326 communicates the session variable to fingerprint tracing program 303. This way, the user may re-execute the problematic query 314 on system 302 and capture trace data 310 via module 306.

At start 405, the user also issues additional session variables via interface 326 for indicating to program 303 what actions are requested for the current fingerprint tracing session. FIG. 4 depicts these actions 410, 420, etc. in a particular sequence and they are, accordingly, described below in the depicted sequence, however, performance of these actions 410, 420, etc. is not limited to the illustrated and described sequence, except as indicated explicitly or as implied by the described context. Indeed, these actions 410, 420, etc. may be performed concurrently in a proper case.

If program 303 detects at 410 that a schema dump is requested, module 306 performs schema dump actions 415 to produce schema 308 as part of fingerprint tracing. (As previously mentioned, schema 308 may be included in trace 310.)

Schema 308 includes a schema dump containing complete definitions of DDL statements to create database, tables and associated objects and may be in the form of a script, according to embodiments of the present invention. Most database servers are capable of generating such definitions into a script. According to embodiments of the present invention, schema dump script 308 is used by DGT 320 to create tables and database objects for alternative input data 324 just as they were encountered in data 304 by query execution module 312 when it executed query 314 on data 304.

The following is an example of a schema dump script 308 that can be used by a Netezza database server and the nzsql utility:

```
-- Create Database
\echo -n 'Creating "SYSTEM" database...'
create database SYSTEM;
\echo 'done.'
\echo -n 'Creating Tables'
CREATE TABLE ADMIN.DEPT ( -- Number of Columns = 2
    DEPT_ID   INTEGER,
    DEPT_NAME CHARACTER(15)
) DISTRIBUTE ON (DEPT_ID);
\echo -n .
CREATE TABLE ADMIN.EMP ( -- Number of Columns = 3
```

-continued

```
    EMP_ID    INTEGER,
    EMP_NAME  CHARACTER(12),
    SALARY    INTEGER
) DISTRIBUTE ON (EMP_ID);
\echo -n .
CREATE TABLE ADMIN.REGISTER ( -- Number of Columns = 2
    EMP_ID   INTEGER,
    DEPT_ID  INTEGER
) DISTRIBUTE ON (EMP_ID);
EOF
```

Also, if program 303 detects at 420 that join fingerprint tracing is requested, module 306 performs actions 425 for capturing join fingerprint tracing as part of trace data 310, as has been described herein above. Likewise, if program 303 detects at 430 that predicate fingerprint tracing is requested, module 306 performs actions 435 for capturing predicate fingerprint tracing as part of trace data 310, as has been described herein above.

Additionally, if program 303 detects at 440 that zone map fingerprint tracing is requested, module 306 performs actions 445 for capturing zone map fingerprint tracing as part of trace data 310, as follows.

Zone maps are internal tables automatically generated by a database server to improve throughput and response time for queries on large data sets that are grouped or nearly ordered, such as for date, timestamp, byteint, integer, and data types. Zone maps reduce disk scan operations that are required to retrieve data by eliminating records outside the start and end range of a WHERE clause on restricted scan queries. That is, zone maps are used to skip portions of tables that do not contain rows of interest and thus reduces the number of disk pages and extents to scan. In turn, this reduces search time, disk contention, and disk I/O. Most database servers have similar implementations but may use different terminology, such as zone Map, Synopsis or Index range. As previously mentioned, the term "zone map" is used herein to encompass any and all of these implementations.

According to embodiments of the present invention, fingerprint tracing module 306 determines ranges of data 304 in respective columns that satisfy query 314 during its execution by query execution module 312 and indicates the ranges in terms specified in the zone map. Fingerprint tracing module 306 writes this range and column information in trace data 310. Compressor 330 then feeds this zone map information from trace data 310 to DGT 320, which responsively limits simulation data that it generates for alternative input data 324, such that data 324 is limited to the determined range for each respective column. This provides more directed data that is closer to customer range values than data generated purely at random.

The following is another example query (Example 4), which illustrates aspects of zone map capture for trace data 310, according to embodiments of the present invention:

SELECT emp_name, dept_name, salary FROM emp e JOIN register r ON e.emp_id=r.emp_id JOIN dept d ON r.dept_id=d.dept_id WHERE salary>3000 AND (dept_name='Dev' OR dept_name='Hardware' OR dept_name='Sales');

The table below indicates zone tag Z1-Z9 ranges defined for the zone map of the salary column for the emp table of data 304:

| Zone Tag | Min | Max |
|---|---|---|
| Z1 | 1000 | 2000 |
| Z2 | 2001 | 3000 |
| Z3 | 3001 | 4000 |
| Z4 | 4001 | 5000 |
| Z5 | 5001 | 6000 |
| Z6 | 6001 | 7000 |
| Z7 | 7001 | 8000 |
| Z8 | 8001 | 9000 |
| Z9 | 9001 | 10,000 |

For this example, result 316 of query 314 execution is as follows:

| EMP_NAME | DEPT_NAME | SALARY |
|---|---|---|
| Foster | Hardware | 7800 |
| Jim | Dev | 5300 |
| Mike | Hardware | 9700 |
| Sanjay | Dev | 5200 |

For execution of this above Example 4 query on the example data 304 emp table herein above, for example, fingerprint tracing module 306 determines, for data 304 in the salary column that satisfy query 314 during its execution by query execution module 312 (i.e., data values encountered having the "T" evaluation state), the number of instances that those particular data 304 values fall within respective Z1-Z9 tagged ranges of the zone map. For this example, the salary column zone-map-related, fingerprint trace data 310 captured by module 306 is as follows:

| Zone Tag | Eval | Count |
|---|---|---|
| Z5 | T | 2 |
| Z7 | T | 1 |
| Z9 | T | 1 |

Fingerprint tracing module 306 also determines data values that yield the "E" evaluation state during query 314 execution, although none are indicated in the above example. DGT 320 generates alternative input data 324 that yield T and E evaluation states responsive to corresponding instances of those states in trace data 310. According to embodiments of the present invention, fingerprint tracing module 306 discards I and F evaluations, so DGT 320 does not generate alternative input data 324 that yield these evaluation states.

Additionally, if program 303 detects at 450 that statistics fingerprint tracing is requested, module 306 performs actions 455 for capturing operation statistics in fingerprint tracing by module 306, which may be included in trace data 310. Operational statistics provide a high-level overview of how system 302 is running in a context of recent system and query activity, which helps with diagnosing problems, understanding performance characteristics and interfacing to system management software. Most database servers are capable of providing query statistics through a plan file or SQL command "GENERATE STATISTICS."

According to embodiments of the present invention, fingerprint trace module 306 parses statistics provided by the database server and captures information thereof in trace data 310, such as table row count, distinct and most common values. DGT 320 uses this information generate simulation data 324 having variety and volume closer to the environment encountered by query execution module 312 when it executed query 314 on data 304. For example, for a query "SELECT*FROM dept;" on the dept table herein above, fingerprint trace module 306 captures in trace data 310 the following statistics provided by the database server:
Statistics of the table:
 Table: dept
 Rows count: 7
Statistics of the columns:
 Column name: dept_name
 Column type: character(15)
 Low Value: 'Admin'
 Hi Value: 'Software'
 Common value: 0
 Column name: dept_id
 Column type: integer
 Low Value: 101
 Hi Value: 107
 Common value: 0

In connection with module 312 execution of a query 314 for which module 306 captures a fingerprint trace 310, when program 303 detects at 460 that execution of the particular query 314 is halted, such as due to completion or interruption due to error detection, lack of progress, etc., program 303 notifies the user via interface 326. The user responsively communicates a session variable "SET SQL_FINGERPRINT_TRACE=OFF" via interface 326 to program 303. In turn, the tracing activity by module 306 responsively stops tracing, which reduces performance overhead in system 302. Alternatively, program 303 may be configured such that when it detects at 460 that execution of the particular query 314 is halted, program 303 notifies the user and module 306 automatically stops the tracing.

Also, at 460, once module 306 stops the tracing, the user may, via interface 326, direct compressor 330 to read trace data 310 and perform the compression, i.e., union, function. (Alternatively, the user may direct data generator 320 to read trace data 310 if fingerprint 306 performs the compression function.)

Upon obtaining trace data 310, including union result 332, the user may direct DGT 320 to perform actions 470 for generating alternative input data 324 as described herein above in detail.

To summarize, fingerprint trace data 310, by design, does not provide all details of query execution, because this may be too voluminous and because it may require extensive computation resources for simulation query execution. Instead, data 310 and union data 332 therefrom provide selective information based on evaluation states that occurred during query execution and that are more likely to be associated with execution trouble. According to at least some embodiments of the present invention, fingerprint trace module 306 may count and include in fingerprint trace data 310 instances of only those combinations of evaluation states that actually arose in query execution. Further, among those combinations that actually arose, fingerprint trace module 306 may count and include in fingerprint trace data 310 instances only of those that satisfied the query. Alternatively, fingerprint trace module 306 may count but data generation module 320 may be configured to not generate alternative input data 324 for trace data 310 instances of combinations that do not satisfy the query.

Still further, data generation module 320 may receive union data 332 from compressor 330 and may responsively generate alternative input data 324 only for producing evaluation states that are indicated as True in union data 332 as described herein above. Accordingly, compressor 330 may modify original query 314 so that modified query 333 executed by query execution module 334 for simulation includes only those clauses indicated as True in union data 332.

Even though fingerprint trace data 310, by design, does not provide all details of query execution, fingerprint tracing according to embodiments of the present invention may, nevertheless, lead to increased accuracy in the behavior reproduced responsive to query processing of the generated, alternative input data 324, since alternative input data 324 is generated based on evidence of events that occurred during query execution as captured in fingerprint trace data 310. By contrast, more randomly generated data may fail to reproduce behavior of the original query execution. As indicated herein above, the particular events captured in fingerprint trace data 310 are instances of evaluation states that satisfy a query. Capturing these events tends to increase accuracy in simulation behavior because these events cause further query execution. That is, in determining whether a row of data satisfies a query, when query execution determines that a clause currently being evaluated is satisfied (a "True" evaluation state), query execution then continues to evaluate a next clause for the row, or else if the True state of the current clause satisfies the overall query for the row, query execution continues on to evaluate a next row.

For database servers that employ a fail-fast predicate evaluation scheme, such as Netezza, an evaluation of "false" in a string of AND'ed predicates P1 AND P2 . . . AND Pn means that the whole expression is false, and the server will stop processing further predicates. Some other database systems that do not have the fail-fast property may continue to evaluate predicates. Nonetheless, having a UNION set of fingerprint trace data is helpful in either case, because it is a true representation of what actually happens in that database system.

Fingerprint tracing and modification of the query executed for simulation increases accuracy in simulation behavior. The reasons for this include at least a tendency for True evaluation states to lead to or otherwise be associated with performance issues more so than False evaluation states. Regardless of whatever the reasons may be for this, experience in applying embodiments of the present invention have shown that applying it provides more nearly ideal simulation performance within constraints of reduced data capture and execution resources.

It is advantageous that embodiments of the present invention Identify data dependent query execution issues and help find the state of query execution during a crash and for internal/external errors, wrong results, non-deterministic results and performance problems. Identifying evaluation states described above, T, F, I and E, helps to simplify or remove predicates from a query that are never evaluated, allowing developers to simplify complex queries and more easily understand and debug. These advantages are accomplished while reducing the amount of data that must be captured and analyzed. Consequently, embodiments of the present invention reduce time and hardware needed to identify data dependent issues in query execution.

Embodiments of the present invention reproduce execution behavior better than random generation methodology, without intensive manual operations and analysis and without compromising customer data privacy. Otherwise, it is often difficult to test regularly, due to voluminous data and complex queries. By reducing back and forth of communication between teams in information gathering to reproduce issues in-house, embodiments of the present invention provide benefits to customer support, development and quality assurance information technology personnel, as well as to customers. This leads to increased customer satisfaction.

Figure 1:
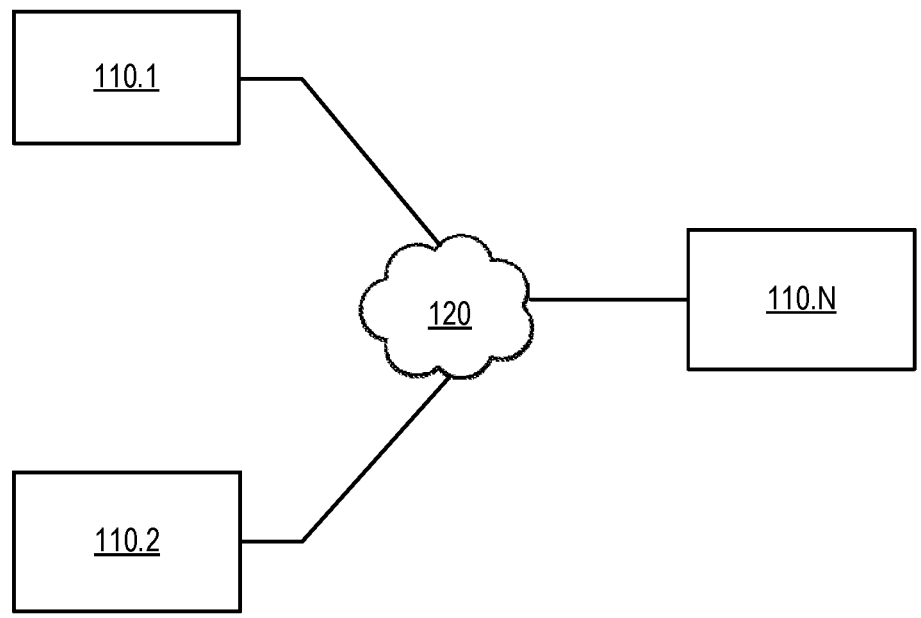
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N connects via network 120, which may be public or private. Systems 110.1, 110.2, etc. include respective modules respectively, which may be program or hardware modules configured to perform tasks for their respective devices.

Figure 2:
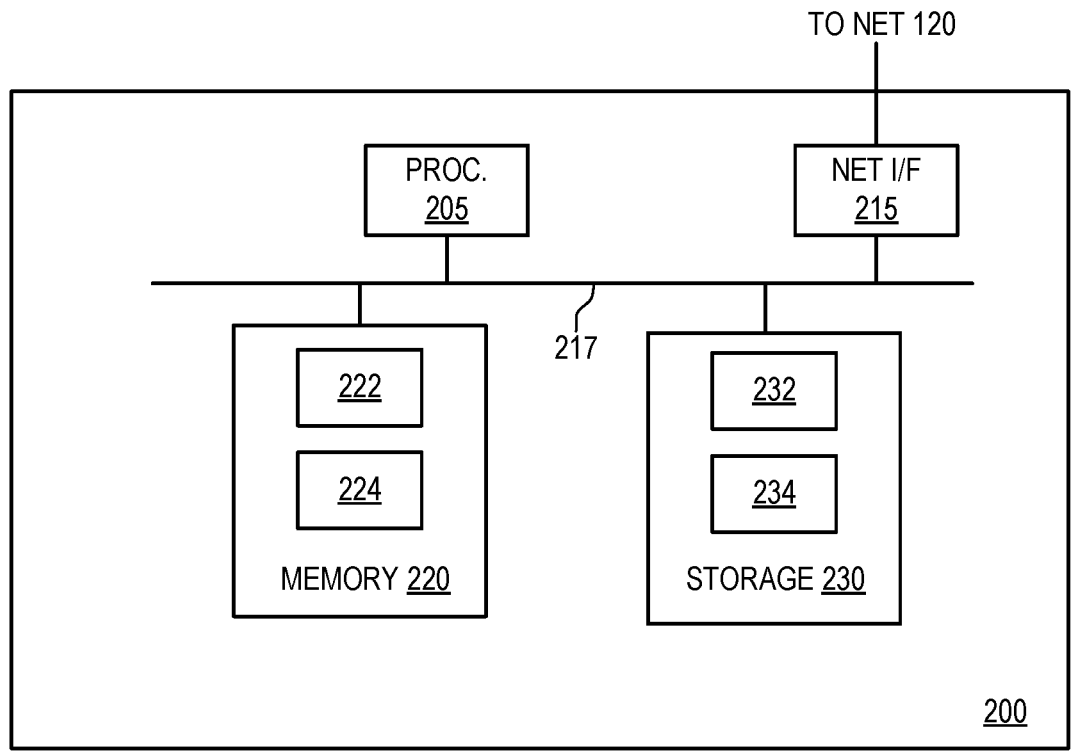
FIG. 2 is a block diagram of devices shown in FIG. 1, according to embodiments of the present invention.

FIG. 2 illustrates a system 200, which may be applied as any or all of computer systems 110.1, 110.2, etc., according to embodiments of the present invention. As shown, system 200 includes a central processing unit (CPU) 205, a network interface 215, an interconnect (i.e., bus) 217, a memory 220, and storage 230. CPU 205 may retrieve and execute programming instructions stored in memory 220. Similarly, CPU 205 may retrieve and store application data residing in memory 220. Interconnect 217 may facilitate transmission, such as of programming instructions and application data, among CPU 205, storage 230, network interface 215, and memory 220. CPU 205 is included to be representative of a single CPU, multiple CPUs, a single CPU having multiple processing cores, and the like. Additionally, memory 220 is included to be representative of a random access memory, which includes data and program modules for run-time execution, such as example data 222 and module 224 shown, according to embodiments of the present invention. However, it should be understood that one or more of modules such as module 224 may be implemented by other hardware and may be firmware.

Data 222 and module 224 may be instances of data and program modules from storage 230, such as example data 232 and module 234 shown, for run-time execution by CPU 205 in memory 220. Data and program modules in storage 230 may include database tables and one or more query execution modules. Storage 230 may be a disk drive storage device, for example. Although shown as a single unit, storage 230 may be a combination of fixed and/or removable storage devices, such as fixed disc drives, floppy disc drives, tape drives, removable memory cards or optical storage, network attached storage (NAS), or a storage area-network (SAN).

The above-described examples and depictions in the Figures are not meant to imply architectural limitations. For example, any of devices 110.1, 110.2, etc. may be a notebook computer, handheld computer, smart phone, kiosk, etc. Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

From the foregoing, it should be understood that according to embodiments of the present invention, the trace data does not include the first input data. Also, the first input data include data values and generating the second input data from the trace data without the first input data generates values for the second input data corresponding to respective ones of the first input data values, wherein each second input data value has a value such that in execution of the second query each second input data value produces the same evaluation state as the evaluation state captured in the trace data for the corresponding first input data value but is otherwise independent of the corresponding first input data value. In another aspect, the trace data includes counts of respective combinations of the evaluation states from the first execution applying the clauses of the first query to rows of the first input data.

According to embodiments of the present invention, generating the second input data from the trace data without the first input data includes generating random values constrained to ranges such that executing the second query on the second input data reproduces the same number of combinations for a predetermined type of the evaluation state combinations. In another aspect, the evaluation states from the first execution include an unevaluated state, wherein each instance of the unevaluated state occurs from an instance of not applying a query clause to an input data row. Also, the evaluation states from the first execution include one or more of a true, false and under-evaluation state, wherein each instance of the true, false and under-evaluation states occurs from an instance of applying one of the query clauses to a row of the first input data.

According to embodiments of the present invention, generating the second input data from the trace data without the first input data includes generating data for the second execution that cause the second execution to reproduce true evaluation states of the first execution excluding unevaluated evaluation states of the first execution. In another aspect, a computer process determines whether a union result of the evaluation states in the trace data is true for each clause in the first query.

According to embodiments of the present invention, the second query is generated from the first query, wherein generating the second query includes eliminating a clause from the first query when the union result for the clause being eliminated is not true. Further, in another aspect, generating the alternative input data responsive to the trace data and the schema for the first input data includes generating data for the second query execution that cause the second query execution to reproduce evaluation states of the first query execution only for the clauses having a true union state.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Herein terms such as "first query," "second query," "first input data" and "alternative input data" are used. It should be understood that unless explicitly stated otherwise or clearly indicated by the context, modifiers such as "first," "second" and "alternative" are merely labels to distinguish one object or action from another and to establish clear antecedent basis for unambiguous reference to the modified object or action, not to denote temporal or hierarchical significance.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims. For example, embodiments of the present invention have been described that relate to clauses in queries such as predicates, joins and zone maps. Tracing and simulation based on a trace as described herein may also be applied to CASE expressions in a query select-list. It should be appreciated from the disclosure herein that embodiments of the present invention may be applied for SQL queries having JOIN clauses for more than one table.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    receiving, for a first execution of a first query on first tables having first data values, trace data having counts of evaluation states of the execution and identifications of query portions referencing variables of the tables and corresponding with the evaluation states;
    generating for second tables, from the trace data and without accessing the first data values, second data values configured to reproduce, by a second execution of a second query, the evaluation states from the first execution; and
    reproducing the evaluation states from the first execution without accessing the first data values by performing the second execution of the second query on the second data values, wherein the first execution evaluates only a first subset of the first data values and the generating the second data values from the trace data generates second data values corresponding to the first subset, and wherein the second execution only evaluates ones of the second data values that correspond to data values of the first subset.

2. The method of claim 1, wherein the generating the second data values does not generate data values other than the data values corresponding to the first subset.

3. The method of claim 2, comprising:
    determining, from the trace data for the first execution, quantities of predetermined types of combinations of the first execution evaluation states wherein the generating the data values that correspond to ones of the first data values not in the first subset comprises:
    generating data values constrained to predetermined ranges such that evaluations of the constrained data values in the second execution of the second query reproduces the same numbers of the predetermined types of evaluation state combinations.

4. The method of claim 1, wherein the generating the second data values does generate data values other than the data values corresponding to the first subset, wherein the generating the second data values includes generating for the second tables unconstrained, random data values that correspond to ones of the first data values not in the first subset.

5. The method of claim 1, comprising:
    receiving the first query; and
    generating the second query from the first query.

6. The method of claim 5, comprising:
    determining whether a union result of the evaluation states in the trace data is true for each of the query portions in the first query.

7. The method of claim 6, wherein generating the second query from the first query includes eliminating a first one of the query portions from the first query when the union result for the first query portion is not true.

8. A system comprising:
    a processor; and
    a computer readable storage medium connected to the processor, where the computer readable storage medium has recorded thereon a program for controlling the processor, and where the processor is operative with the program to execute the program for:
    receiving, for a first execution of a first query on first tables having first data values, trace data having counts of evaluation states of the execution and identifications of query portions referencing variables of the tables and corresponding with the evaluation states;
    generating for second tables, from the trace data and without accessing the first data values, second data values configured to reproduce, by a second execution of a second query, the evaluation states from the first execution; and
    reproducing the evaluation states from the first execution without accessing the first data values by performing the second execution of the second query on the second data values, wherein the first execution evaluates only a first subset of the first data values and the generating the second data values from the trace data generates second data values corresponding to the first subset, and wherein the second execution only evaluates ones of the second data values that correspond to data values of the first subset.

9. The system of claim 8, wherein the generating the second data values does not generate data values other than the data values corresponding to the first subset.

10. The system of claim 9, where the processor is operative with the program to execute the program for:
    determining, from the trace data for the first execution, quantities of predetermined types of combinations of the first execution evaluation states wherein the generating the data values that correspond to ones of the first data values not in the first subset comprises:
generating data values constrained to predetermined ranges such that evaluations of the constrained data values in the second execution of the second query reproduces the same numbers of the predetermined types of evaluation state combinations.

11. The system of claim 8, wherein the generating the second data values does generate data values other than the data values corresponding to the first subset, wherein the generating the second data values includes generating for the second tables unconstrained, random data values that correspond to ones of the first data values not in the first subset.

12. The system of claim 8 where the processor is operative with the program to execute the program for:
receiving the first query; and
generating the second query from the first query.

13. The system of claim 12, where the processor is operative with the program to execute the program for:
determining whether a union result of the evaluation states in the trace data is true for each of the query portions in the first query.

14. The system of claim 13, wherein generating the second query from the first query includes eliminating a first one of the query portions from the first query when the union result for the first query portion is not true.

15. A computer program product for user-processing of data in a computer network, including a computer readable storage medium having instructions stored thereon for execution by a computer system, where the instructions, when executed by the computer system, cause the computer system to implement a method comprising: receiving, for a first execution of a first query on first tables having first data values, trace data having counts of evaluation states of the execution and identifications of query portions referencing variables of the tables and corresponding with the evaluation states;
generating for second tables, from the trace data and without accessing the first data values, second data values configured to reproduce, by a second execution of a second query, the evaluation states from the first execution; and
reproducing the evaluation states from the first execution without accessing the first data values by performing the second execution of the second query on the second data values, wherein the first execution evaluates only a first subset of the first data values and the generating the second data values from the trace data generates second data values corresponding to the first subset, and wherein the second execution only evaluates ones of the second data values that correspond to data values of the first subset.

16. The computer program product of claim 15, wherein the generating the second data values does not generate data values other than the data values corresponding to the first subset.

17. The computer program product of claim 16, where the instructions, when executed by the computer system, cause the computer system to implement a method comprising:
determining, from the trace data for the first execution, quantities of predetermined types of combinations of the first execution evaluation states wherein the generating the data values that correspond to ones of the first data values not in the first subset comprises:
generating data values constrained to predetermined ranges such that evaluations of the constrained data values in the second execution of the second query reproduces the same numbers of the predetermined types of evaluation state combinations.

18. The computer program product of claim 15, wherein the generating the second data values does generate data values other than the data values corresponding to the first subset, wherein the generating the second data values includes generating for the second tables unconstrained, random data values that correspond to ones of the first data values not in the first subset.

19. The computer program product of claim 15, where the instructions, when executed by the computer system, cause the computer system to implement a method comprising:
receiving the first query; and
generating the second query from the first query.

20. The computer program product of claim 19, where the instructions, when executed by the computer system, cause the computer system to implement a method comprising:
determining whether a union result of the evaluation states in the trace data is true for each of the query portions in the first query.

* * * * *